(12) United States Patent
Thangarasa et al.

(10) Patent No.: US 10,624,049 B2
(45) Date of Patent: Apr. 14, 2020

(54) MEASUREMENT OF CANDIDATES SYNCHRONIZATION REFERENCES BY DEVICE-TO-DEVICE USER EQUIPMENT

(71) Applicant: TELEFONAKTIEBOLAGET L M ERICSSON (PUBL), Stockholm (SE)

(72) Inventors: Santhan Thangarasa, Vällingby (SE); Muhammad Kazmi, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 555 days.

(21) Appl. No.: 15/008,810

(22) Filed: Jan. 28, 2016

(65) Prior Publication Data

US 2016/0249307 A1    Aug. 25, 2016

Related U.S. Application Data

(60) Provisional application No. 62/118,294, filed on Feb. 19, 2015.

(51) Int. Cl.
*H04W 56/00* (2009.01)

(52) U.S. Cl.
CPC ................. *H04W 56/001* (2013.01)

(58) Field of Classification Search
None
See application file for complete search history.

(56) References Cited

U.S. PATENT DOCUMENTS

| | | | |
|---|---|---|---|
| 2013/0229971 A1* | 9/2013 | Siomina | H04W 24/10 370/312 |
| 2014/0092761 A1* | 4/2014 | Behravan | H04W 24/02 370/252 |
| 2016/0029333 A1* | 1/2016 | Seo | H04L 27/2655 370/350 |
| 2016/0212721 A1* | 7/2016 | Sheng | H04W 48/16 |
| 2016/0219528 A1* | 7/2016 | Kawasaki | H04W 76/023 |
| 2017/0006563 A1* | 1/2017 | Lindoff | H04W 56/001 |

* cited by examiner

*Primary Examiner* — Ayaz R Sheikh
*Assistant Examiner* — Sori A Aga

(57) ABSTRACT

A device-to-device (D2D) user equipment (UE) apparatus identifies at least first and second synchronization reference (SyncRef) UEs each satisfying a predetermined selection/reselection criterion with respect to the D2D UE, determines a measurement period in which to perform one or more measurements on the identified at least first and second SyncRef UEs, and performs the one or more measurements on each of the identified at least first and second SyncRef UEs during the determined measurement period.

28 Claims, 8 Drawing Sheets

Identify First and Second SyncRef UEs each Satisfying Predetermined Selection/Reslection Criterion with Respect to D2D UE — S705

Determine Measurement Period in which to Perform One or More Measurements on First and Second SyncRef UEs — S710

Performing Measurements on First and Second SyncRef UEs During Measurement Period — S715

MEASUREMENT OF CANDIDATES SYNCHRONIZATION REFERENCES BY DEVICE-TO-DEVICE USER EQUIPMENT

CROSS-REFERENCE TO RELATED APPLICATIONS

This application claims priority to U.S. Provisional Application No. 62/118,294 filed on Feb. 19, 2015, the subject matter of which is hereby incorporated by reference in its entirety.

TECHNICAL FIELD

The disclosed subject matter relates generally to telecommunications and more particularly to measurement of candidate synchronization references by device-to-device (D2D) user equipment (UE).

BACKGROUND

D2D operation is a general term that encompasses, among other things, transmission and/or reception of any type of D2D signals (e.g. physical signals, physical channel etc.) by a D2D communication capable UE and/or by a D2D discover capable UE. D2D operation may therefore also be referred to as D2D transmission, D2D reception, D2D communication, etc.

A D2D UE may be referred to interchangeably as a ProSe capable UE. D2D discovery capable UE is also referred to as UE capable of Prose direct discovery and D2D direct communication UE is also referred to as UE capable ProSe direct communication. The link and/or carrier that is used for the ProSe direct communication and ProSe direct discovery between UEs is referred to as sidelink.

A UE typically performs radio measurements on both a serving cell and neighbor cells over some known reference symbols or pilot sequences. The measurements are generally performed on cells on an intra-frequency carrier, inter-frequency carrier(s), and inter-RAT carriers(s) (depending on UE capability, whether it supports a designated RAT). To enable inter-frequency and inter-RAT measurements for a UE requiring measurement gaps, the network typically must configure the gaps.

UE measurements can be done for various purposes, such as mobility, positioning, self-organizing network (SON), minimization of drive tests (MDT), operation and maintenance (O&M), and network planning and optimization. Examples of measurements in LTE are Cell identification (e.g., physical cell identifier [PCI] acquisition), Reference symbol received power (RSRP), Reference symbol received quality (RSRQ), CGI acquisition, Reference signal time difference (RSTD), UE Receive-Transmit (RX-TX) time difference measurement, and Radio link monitoring (RLM), including Out of synchronization (out of sync) detection and In synchronization (in-sync) detection. Channel state information (CSI) measurements performed by the UE are used for scheduling, link adaptation etc. by the network. Examples of CSI measurements or other information in CSI reports include Channel Quality Indicator (CQI), Precoding Matrix Indicator (PMI), Rank Indicator (RI), etc. Such measurements may be performed on reference signals such as Cell-Specific Reference Signal (CRS), CSI Reference Signals (CSI-RS), or Demodulation Reference Signal (DMRS).

A radio network node may also perform various measurements on signals transmitted and/or received by the radio network node. Such measurements may be performed to support different functions such as mobility (e.g. cell selection, handover etc.), positioning a UE, link adaption, scheduling, load balancing, admission control, interference management, and interference mitigation. Examples of such measurements include Signal-to-Noise Ratio (SNR), Signal-to-Interference-and-Noise Ratio (SINR), received interference power (RIP), BLER, propagation delay between UE and itself, transmit carrier power, transmit power of specific signals (e.g. Tx power of reference signals), positioning measurements like TA, and eNodeB Rx-Tx time difference.

To identify an unknown cell (e.g. new neighbor cell) a UE typically acquires the timing of that cell and then a physical cell ID (PCI), where the total number of possible PCIs is typically 504. Subsequently, the UE measures the RSRP and/or RSRQ of the newly identified cell for the UE's own use and/or for use by the network node.

To acquire the timing of the cell and the PCI, the UE typically inspects information in downlink (DL) subframe #0 and/or DL subframe #5, which carry synchronization signals (i.e., a primary synchronization signal [PSS] and a secondary synchronization signal [SSS]). In particular, the UE searches or identifies a cell (i.e. acquires the PCI of the cell) by correlating the received PSS/SSS signals in DL subframe #0 and/or in DL subframe #5 with one or more of the pre-defined PSS/SSS sequences. The use of subframe #0 and/or in DL subframe #5 for PCI acquisition depends upon its implementation.

The UE regularly attempts to identify neighbor cells on at least the serving carrier frequenc(ies). But it may also search cells on non-serving carrier(s) when configured by the network node. To conserve power, the UE may search only in one of the DL subframes #0 and #5. To further save battery power, the UE may search the cell once every 40 ms in non-discontinuous-reception (non-DRX) or in short DRX cycle (e.g. up to 40 ms). In longer DRX cycle the UE typically searches a cell once every DRX cycle. During each search attempt the UE typically stores a snapshot of 5-6 ms and post processes by correlating the stored signals with the known PSS/SSS sequences. In non-DRX the UE is able to identify an intra-frequency cell (including RSRS/RSRQ measurements) within 800 ms (i.e. 20 attempts in total including 15 and 5 samples for cell identification [PCI] acquisition) and RSRP/RSRQ measurement).

Device-to-device (D2D) UEs typically transmit D2D signals or channels in an uplink part of the spectrum. D2D operation by a UE is generally in a half-duplex mode, i.e. the UE can either transmit D2D signals/channels or receive D2D signals/channels. There may also be D2D relay UEs that may relay some signals to other D2D UEs. There is also control information for D2D, some of which is transmitted by D2D UEs and the other is transmitted by eNodeBs (e.g., D2D resource grants for D2D communication transmitted via cellular DL control channels). D2D transmissions may occur on resources which are configured by the network or selected autonomously by the D2D UE.

D2D communication implies transmitting by a D2D transmitter D2D data and D2D communication control information with scheduling assignments (SAs) to assist D2D receivers of the D2D data. D2D data transmissions are according to configured patterns and in principle may be transmitted rather frequently. SAs are transmitted periodically. D2D transmitters that are within the network coverage may request eNodeB resources for their D2D communication transmissions and receive in response D2D resource grants for SA and D2D data. Furthermore, eNodeB may broadcast D2D resource pools for D2D communication.

D2D discovery messages are transmitted in infrequent periodic subframes. ENodeBs may broadcast D2D resource pools for D2D discovery, both for reception and transmission.

D2D communication supports two different modes of D2D operation: mode 1 and mode 2. In mode 1, the location of resources for transmission of a scheduling assignment by the broadcasting UE comes from the eNodeB. The location of the resource(s) for transmission of the D2D data by the broadcasting UE comes from the eNodeB. In mode 2, a resource pool for a scheduling assignment is pre-configured and/or semi-statically allocated. The UE on its own selects the resource for scheduling assignment from the resource pool for scheduling assignment to transmit its scheduling assignment.

PCell interruption of 1 subframe occurs where the UE switches its reception between D2D-to-WAN or WAN-to-D2D. This is because the UE receiver chain needs to be retuned every time the operation is switched from WAN to D2D reception and from D2D to WAN reception. This applies to both D2D discovery and D2D communication capable UEs. It is generally beneficial to partition uplink resources between cellular uplink and D2D operation in a way that avoids or minimizes the risk of switching occurring in a certain subframe(s), e.g., subframe #0 and/or #5, of PCell. These subframes contain information such as PSS/SSS for doing cell search, carrying out cell measurements and they also contain MIB/SIB1 information for SI reading procedures. In addition to interruption due to switching, there may be additional interruption of 1 subframe due to the RRC reconfiguration procedure. While the switching interruption takes place for single RX UE (e.g. D2D discovery capable UEs), the RRC reconfiguration interruption takes place for all types of D2D UEs (e.g. D2D Discovery capable and D2D Communication capable).

As will be apparent from the following description, systems and methods that improve the above and other aspects of D2D operation are desired.

SUMMARY

In some embodiments of the disclosed subject matter, a method performed by a D2D UE in a wireless communication system comprises identifying at least first and second SyncRef UEs each satisfying a predetermined selection/reselection criterion with respect to the D2D UE, determining a measurement period in which to perform one or more measurements on the identified at least first and second SyncRef UEs, and performing the one or more measurements on each of the identified at least first and second SyncRef UEs during the determined measurement period.

In some related embodiments, the method further comprises identifying the at least first and second SyncRef UEs comprises inspecting stored identifiers for the at least first and second SyncRef UEs within the D2D UE.

In some related embodiments, method further comprises identifying at least first and second SyncRef UEs comprises identifying at least one newly detectable SyncRef UE.

In some related embodiments, the method further comprises selecting a synchronization reference for the D2D UE from among a set of candidate synchronization references including the identified at least first and second SyncRef UEs based on at least the one or more measurements.

In some related embodiments, the method further comprises detecting that the D2D UE has lost synchronization with a current synchronization reference, and performing the one or more measurements on each of the identified at least first and second SyncRef UEs in response to detecting that the D2D UE has lost synchronization with the current synchronization reference.

In some related embodiments, the current synchronization reference is a network node.

In some related embodiments, the one or more measurements comprise sidelink reference signal received power (S-RSRP) measurements.

In some related embodiments, the method further comprises detecting a coverage scenario for the D2D UE, and performing the one or more measurements on each of the identified at least first and second SyncRef UEs in response to determining that the coverage scenario is an out-of-network coverage (ONC) scenario.

In some related embodiments, detecting the coverage scenario comprises identifying the coverage scenario as the ONC scenario in response to determining that one or more wide area network (WAN) measurements performed by the D2D UE are below corresponding threshold values.

In some related embodiments, the measurement period is approximately 400 ms.

In some related embodiments, the selection/reselection criterion is satisfied by each of the first and second SyncRef UEs according to a corresponding sidelink reference signal received power (S-RSRP) measurement performed by the D2D UE.

In some related embodiments, the at least first and second SyncRef UEs comprise six SyncRef UEs.

In some related embodiments, the method further comprises identifying a cell satisfying one or more predetermined cell identification criteria, determining a measurement period in which to perform one or more measurements on the identified cell, and performing the one or more measurements on the identified cell during the determined measurement period. In such embodiments, the method may further comprise performing the one or more measurements on the plurality of the identified cells during the determined measurement period. In such embodiments, the method may still further comprise detecting a coverage scenario for the D2D UE, and performing the one or more measurements on each of the identified at least cells in response to determining that the coverage scenario is any of an in-network coverage (INC) scenario or partial network coverage (PNC).

In some related embodiments, the at least first and second synchronization reference (SyncRef) UEs are identified in series time. In some related embodiments, the one or more measurements are performed on the identified at least first and second SyncRef UEs in parallel.

In some embodiments of the disclosed subject matter, a device-to-device (D2D) user equipment (UE) apparatus comprises at least one processor operatively coupled to a memory and configured to identify at least first and second synchronization reference (SyncRef) UEs each satisfying a predetermined selection/reselection criterion with respect to the D2D UE, determine a measurement period in which to perform one or more measurements on the identified at least first and second SyncRef UEs, and perform the one or more measurements on each of the identified at least first and second SyncRef UEs during the determined measurement period.

In some related embodiments, the at least one processor is further configured to select a synchronization reference for the D2D UE from among a set of candidate synchronization references including the identified at least first and second SyncRef UEs based on at least the one or more measurements. The at least one processor may be further configured to detect that the D2D UE has lost synchronization with a current synchronization reference, and perform the one or more measurements on each of the identified at least first and second SyncRef UEs in response to detecting that the D2D UE has lost synchronization with the current synchronization reference. In some related embodiments, the current synchronization reference is a network node.

In some related embodiments, the one or more measurements comprise sidelink reference signal received power (S-RSRP) measurements.

In some related embodiments, the at least one processor is further configured to detect a coverage scenario for the D2D UE, and perform the one or more measurements on each of the identified at least first and second SyncRef UEs in response to determining that the coverage scenario is an out-of-network coverage (ONC) scenario. The detection of the coverage scenario may comprise identifying the coverage scenario as the ONC scenario in response to determining that one or more wide area network (WAN) measurements performed by the D2D UE are below corresponding threshold values.

In some related embodiments, the measurement period is approximately 400 ms.

In some related embodiments, the selection/reselection criterion is satisfied by each of the first and second SyncRef UEs according to a corresponding sidelink reference signal received power (S-RSRP) measurement performed by the D2D UE.

In some related embodiments, the at least first and second SyncRef UEs comprise six SyncRef UEs.

In some related embodiments, the at least one processor is further configured to identify a cell satisfying one or more predetermined cell identification criteria, determine a measurement period in which to perform one or more measurements on the identified cell, and perform the one or more measurements on the identified cell during the determined measurement period. The at least one processor may be further configured to perform the one or more measurements on the plurality of the identified cells during the determined measurement period.

In some related embodiments, the at least one processor is further configured to detect a coverage scenario for the D2D UE, and performing the one or more measurements on each of the identified at least cells in response to determining that the coverage scenario is any of an in-network coverage (INC) scenario or partial network coverage (PNC).

In some related embodiments, the at least first and second synchronization reference (SyncRef) UEs are identified in series time. In some related embodiments, the one or more measurements are performed on the identified at least first and second SyncRef UEs in parallel.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
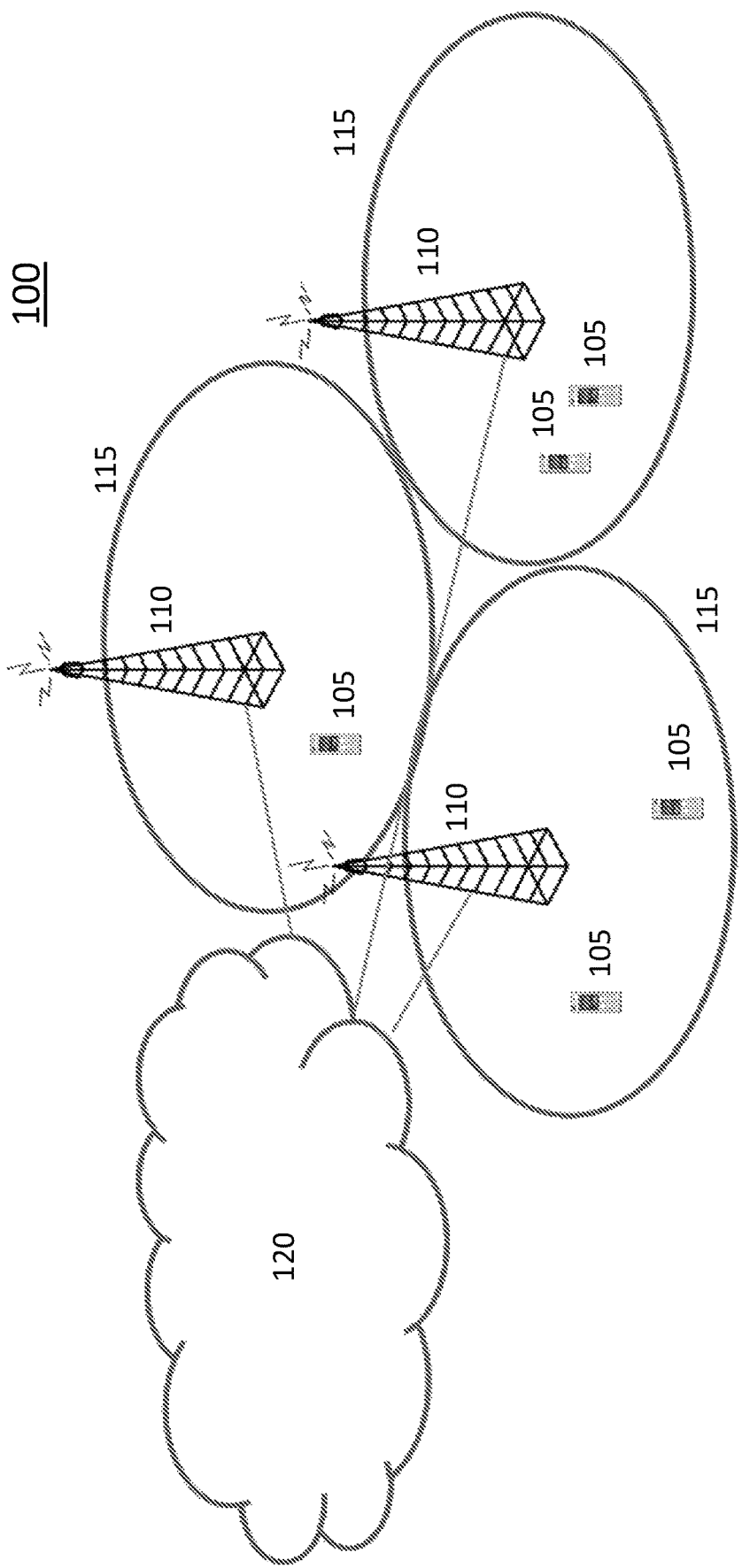
FIG. 1 is a diagram illustrating an LTE network.

The following description presents various embodiments of the disclosed subject matter. These embodiments are presented as teaching examples should not be construed as limiting the scope of the disclosed subject matter. For example, certain details of the described embodiments may be modified, omitted, or expanded upon without departing from the scope of the described subject matter.

In general, the disclosed subject matter provides techniques and technologies for measurement on neighbor synchronization references for D2D UEs in in-network, partial-network, and out-of-network coverage scenario that can be implemented in D2D capable UEs. For instance, in certain embodiments a D2D UE determines or detects its coverage scenario based on one or more signal measurements e.g. in out of coverage if no DL WAN signal is received by the D2D UE. The D2D UE, upon identifying synchronization sources (e.g. cell or D2D synchronization reference), measures on the identified synchronization source. The D2D UE measures on K (K>1) identified D2D synchronization sources. The D2D UE maintains a list of possible candidate synchronization references that it may use for e.g. cell selection and cell reselection. If any of the candidate synchronization references triggers the criteria to become a serving synchronization source, the D2D UE may perform selection and/or reselection of synchronization reference to that measured synchronization reference.

Certain embodiments are designed to overcome particular shortcomings of conventional approaches, as recognized by the inventors. For example, in conventional approaches, D2D UEs are required to operate in various network coverage scenarios e.g. in-coverage, partial coverage and out-of-network coverage (ONC) scenarios. With in-coverage and partial coverage the D2D UE directly or indirectly maintains synchronization with the cell e.g. derives its UL timing with respect to the timing of DL cell such as its serving cell. In other words, with in-coverage and also partial coverage, the synchronization reference is the DL timing of the cell. The out-of-network coverage scenario is however very different from in-coverage or partial coverage scenarios because of various reasons. One reason is that with ONC, the D2D UE cannot use any cell as the synchronization reference for deriving its timing e.g. UL Tx and/or DL Rx timings used for transmitting and receiving D2D signals respectively. Another reason is that with ONC, the synchronization reference may not be physically fixed as in cellular case (e.g. fixed location of BS). The out of coverage synchronization references may be more mobile and may enter the vicinity of a D2D UE and leave the vicinity of the D2D in unpredictable manner. Furthermore the mobility of the D2D UE makes the synchronization procedure even more complex and may lead to incorrect derivation of timing when D2D UE transmits and/or receives D2D signals. Thus selecting and re-selecting a synchronization source for a D2D UE is more difficult compared to the legacy LTE UE. This means that the risk of a D2D UE in ONC loses its transmitter and receiver-timing synchronization is higher than for a legacy LTE UE. This may lead to complete disruption of D2D operation of the D2D UE.

By addressing the above and other shortcomings of conventional approaches, the described embodiments may provide various benefits, such as enabling D2D UE in out-of-network coverage to select and reselect synchronization references more reliably, enabling D2D UE in in-coverage and/or partial coverage scenario to select and reselect synchronization references more reliably, and/or enabling D2D UE to synchronize its receive and transmitter more reliably enabling D2D operation (D2D Discovery and D2D Direct Communication) to be performed in a more reliable manner. Certain embodiments may also enable finding of candidate synchronization references of a D2D UE to be performed much faster, or enabling handover and automatic neighbor relations (ANR) functionalities to be performed more reliably.

In the description that follows, the term "network node" may denote any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT etc.

The term UE may denote any type of wireless device communicating with a network node and/or with another UE in a cellular or mobile communication system. Examples of UEs include a target device, D2D UE, machine type UE or UE capable of machine to machine (M2M) communication, PDA, PAD, Tablet, mobile terminals, smart phone, laptop embedded equipped (LEE), laptop mounted equipment (LME), USB dongles etc.

The term out-of-coverage (OOC) may interchangeably be referred to as out-of-network coverage (ONC), out of WAN coverage, out of cellular coverage, any cell selection state etc. In an OOC scenario D2D UEs communicating with each other are not under network node coverage. Consequently, the D2D UEs do not receive signals from and/or transmit signals to any network node in the network. For example, a D2D UE can be considered in OOC if one or more downlink received signal level or signal measurements (e.g. quality and/or signal strength) from the strongest cell (e.g. serving cell) fall below their respective thresholds over certain time period e.g. this may occur after the radio link failure. The threshold may be set at very low value such as close to more accurately noise level to detect the absence of cell coverage. Examples of signal measurements are path loss, RSRP, SNR, SINR, CQI, RSRQ, BLER etc. Typically the lack of coverage is due to complete absence of the network coverage in the vicinity of the D2D UEs. Due to which the D2D UEs cannot use timing and frequency synchronization based on signals from any cell in the network.

The described embodiments may be implemented in any appropriate type of communication system supporting any suitable communication standards and using any suitable components. As one example, certain embodiments may be implemented in an LTE network, such as that illustrated in FIG. 1. Alternatively, the certain embodiments could be implemented in any RAT or multi-RAT system, where the UE receives and/or transmit signals (e.g. data) e.g. LTE FDD/TDD, WCDMA/HSPA, GSM/GERAN, Wi Fi, WLAN, CDMA2000 etc.

Referring to FIG. 1, a communication network 100 comprises a plurality of wireless communication devices 105 (e.g., conventional UEs, machine type communication (MTC)/machine-to-machine (M2M) UEs) and a plurality of radio access nodes 110 (e.g., eNodeBs or other base stations). Communication network 100 is organized into cells 115, which are connected to a core network 120 via corresponding to radio access nodes 110. Radio access nodes 110 are capable of communicating with wireless communication devices 105 along with any additional elements suitable to support communication between wireless communication devices or between a wireless communication device and another communication device (such as a landline telephone).

Figure 2:
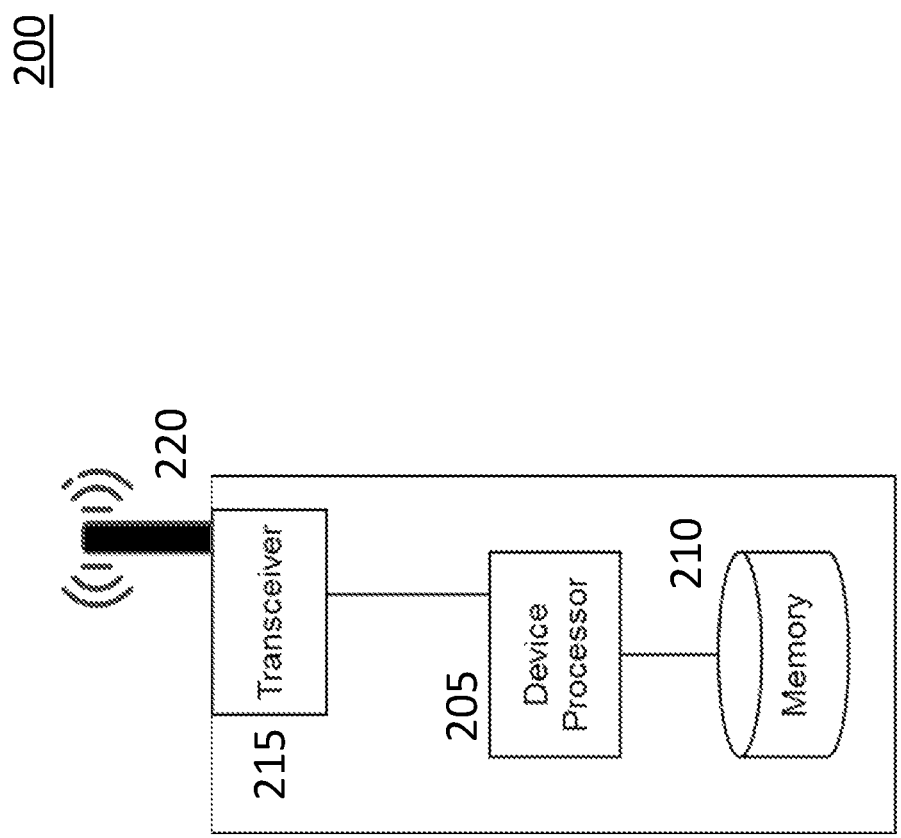
FIG. 2 is a diagram illustrating a wireless communication device.

Although wireless communication devices 105 may represent communication devices that include any suitable combination of hardware and/or software, these wireless communication devices may, in certain embodiments, represent devices such as an example wireless communication device illustrated in greater detail by FIG. 2. Similarly, although the illustrated radio access node may represent network nodes that include any suitable combination of hardware and/or software, these nodes may, in particular embodiments, represent devices such as the example radio access node illustrated in greater detail by FIG. 3.

Referring to FIG. 2, a wireless communication device 200 comprises a processor 205, a memory, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2. Alternative embodiments may include additional components beyond those shown in FIG. 2 that may be responsible for providing certain aspects of the device's functionality, including any of the functionality described herein.

Figure 3:
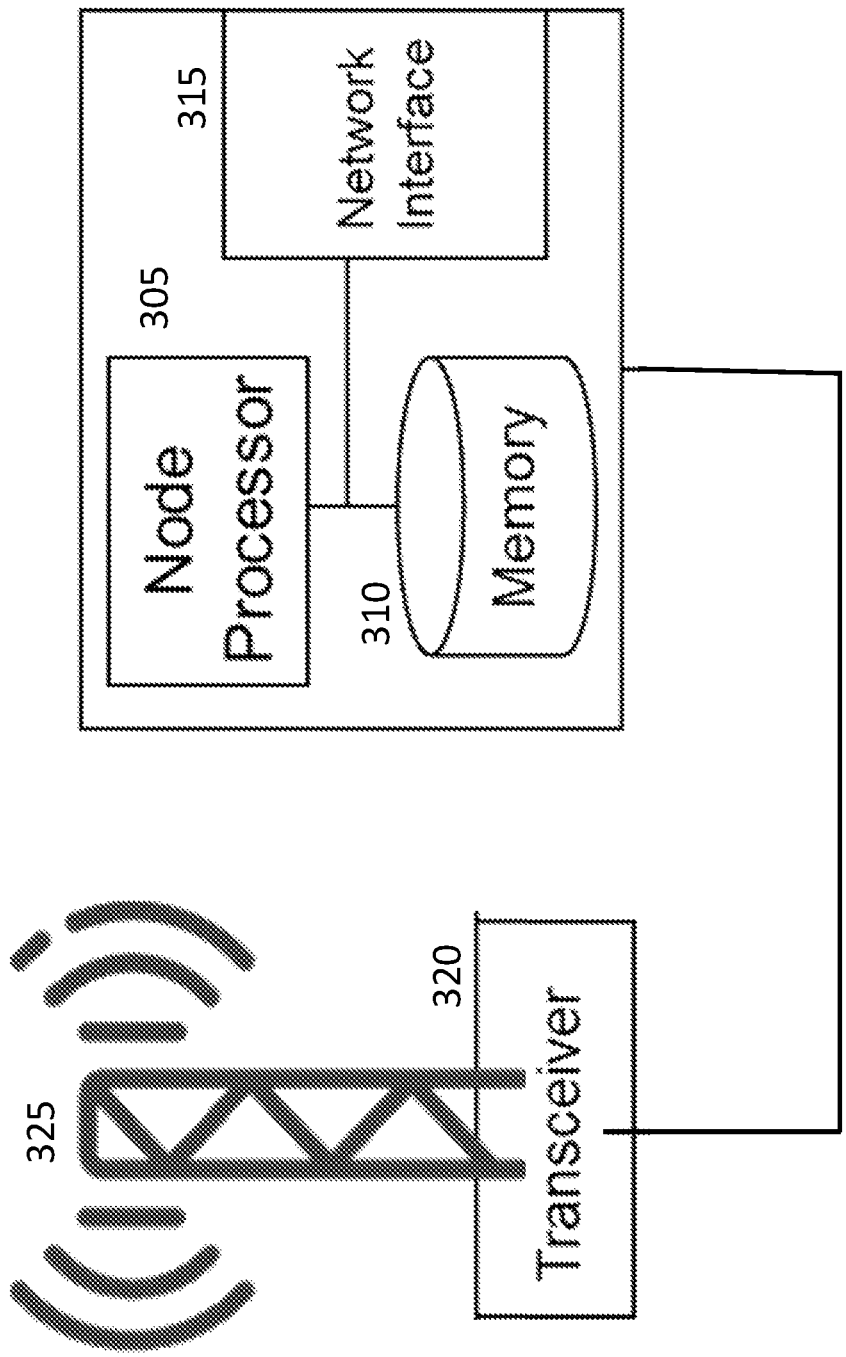
FIG. 3 is a diagram illustrating a radio access node.

Referring to FIG. 3, a radio access node 300 comprises a node processor 305, a memory 310, a network interface 315, a transceiver 320, and an antenna 325. In certain embodiments, some or all of the functionality described as being provided by a base station, a node B, an enodeB, and/or any other type of network node may be provided by node processor 305 executing instructions stored on a computer-readable medium, such as memory 310 shown in FIG. 3. Alternative embodiments of radio access node 400 may comprise additional components to provide additional functionality, such as the functionality described herein and/or related supporting functionality.

Various alternative embodiments may be realized in relation to different network scenarios, as described below. One scenario, for instance, is where a D2D UE operates in out-of-network-coverage and performs measurements in relation to neighbor synchronization references. Another scenario is where a D2D UE operates in in-coverage or partial-coverage and performs measurements in relation to neighbor synchronization references.

In a general scenario, a network comprises at least one network node serving a first cell, (e.g., "PCell" or "serving cell"). A D2D capable UE (or "D2D UE") can be pre-configured with ProSe resources for ProSe operation of the D2D UE on a sidelink. The pre-configured ProSe resources may in particular be used by the D2D UE when operating in ONC. The sidelink may typically operate on a carrier of the PCell (or "serving carrier frequency" or "intra-frequency carrier"). The sidelink may also be configured for ProSe operation on a non-serving carrier of the D2D UE e.g.

inter-frequency carrier frequency for WAN measurements or carrier frequency only configured for ProSe operation.

In some embodiments the D2D may also be configured with another cell that is configurable upon need basis (e.g., "SCell1"). In some embodiments the SCell1 may be served by a second network node. The described concepts may apply regardless of whether PCell and one or more SCells are served by the same or different network nodes. In this case D2D UE can be pre-configured with ProSe resources for ProSe operation on sidelink which may operate on carrier of PCell or of SCell or of any non-serving carrier. The D2D UE can be pre-configured with ProSe resources for ProSe operation on plurality of sidelinks e.g. carriers of PCell, SCell1 and non-serving carrier.

The network node may also configure the D2D UE with a third cell (e.g., "SCell2") on a different carrier on need basis.

There may typically be two types of UEs in the network: (1) a first type, type 1, being a cellular capable UE operating cellular traffic aka WAN capable UE or legacy UE, and (2) a second type, type 2, being a D2D capable UE, also capable of cellular operation. The type 2 UE can be configured to operate for only WAN traffic in case D2D operation is not required. The UEs can be configured to operate on any cells. The described concepts may apply when at least one type 2 UE is available in the network. Such a UE can be configured with at least one SCell. The PCell, PSCell and SCell(s) are UE specific. However, a plurality of UEs can be configured with the same cell as their PCell or SCell or PSCell. Therefore typically a group of UEs may have the same PCell, which is different than the PCell of another group of UEs.

The D2D UE is able to operate some D2D operations while being out-of-network-coverage. Examples of such operations include D2D Communication, D2D discovery, D2D transmission, and D2D reception, to name but a few. The D2D UE configured with one or more SCells, may have lost all serving cells to be in ONC i.e. lost PCell and SCell(s).

Figure 4:
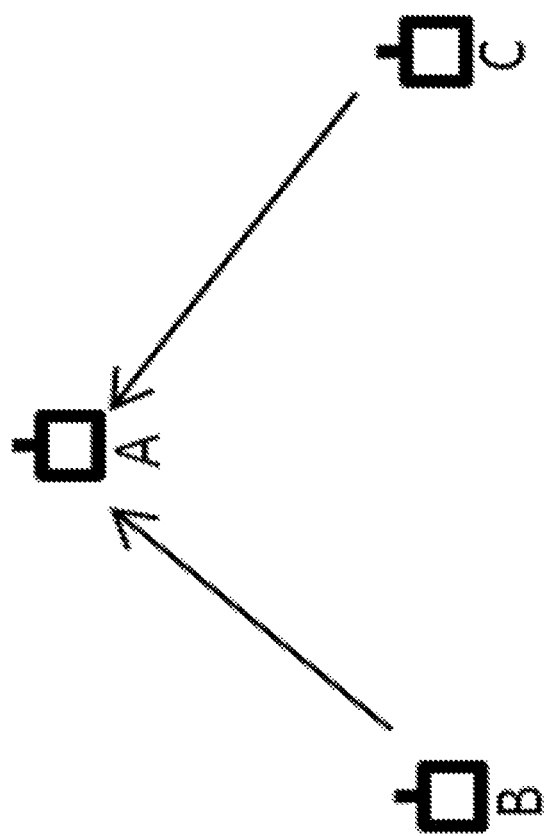
FIG. 4 illustrates a D2D UE that has lost its synchronization reference while out-of-network-coverage.
Figure 5:
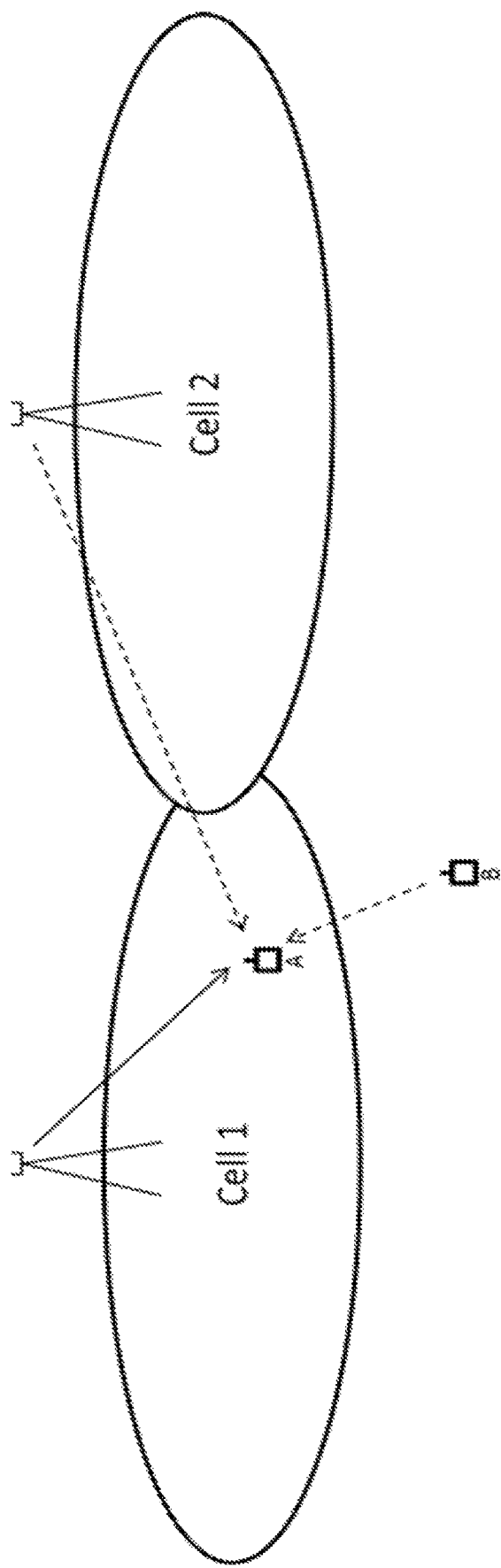
FIG. 5 illustrates a D2D UE that is synchronized to a cell.

FIG. 4 illustrates a D2D UE that has lost its synchronization reference while out-of-network-coverage, and FIG. 5 illustrates a D2D UE that is synchronized to a cell. In the example of FIG. 4, a first D2D UE "A" is out-of-network-coverage and is synchronized with a second D2D UE "B". In other words, it performs D2D communication using UE B as a synchronization reference.

Referring to FIGS. 4 and 5, at some point in time, a problem arises where UE A loses its synchronization to UE B or any other synchronization references for some reason. At such point, UE B may not be detectable by UE A, so UE A must search for other synchronization references. In this example it is assumed that UE A eventually finds a third D2D UE "C". In such a scenario, it would be beneficial for D2D UE A in the out-of-network-coverage scenario to measure on already identified synchronization references. Among other benefits, this would allow selection and reselection of synchronization references to be performed much faster due to prior awareness.

While being in network coverage, the UE A may be synchronized to another cell, e.g. Cell A. The UE may evaluate the quality of received measurement from Cell A and if the received quality becomes unacceptable, UE A may re-select its synchronization to another cell, e.g. Cell B or another UE e.g. UE C depending on the criteria. Also being in partial network coverage, UE A may be indirectly synchronized to another cell, (e.g. Cell A) via yet another D2D UE (e.g. a UE D, not shown).

Certain embodiments address the problem of UE A in this scenario interfering with Cell B by performing D2D operations using pre-configured ProSe resources for operation in out-of-network-coverage.

Prior to entering ONC, UE A may also be configured by a last serving cell (e.g. PCell and/or SCell(s)) with one or more carriers for doing measurements on the cells of the configured carriers. UE A may be configured with such carrier(s) for measuring in idle state and/or in connected state. UE A may also be preconfigured with one or more carriers specifically for D2D operation in ONC. In some embodiments these D2D specific carriers may be the same as the serving carriers. The same or different set of carriers may be configured for measurements in idle state and connected state. Examples of such carriers are serving carriers (e.g. intra-frequency aka serving carrier, PCC, SCC(s) PSCC etc) and non-serving carriers (e.g. inter-frequency carriers, inter-RAT carriers etc).

Figure 6:
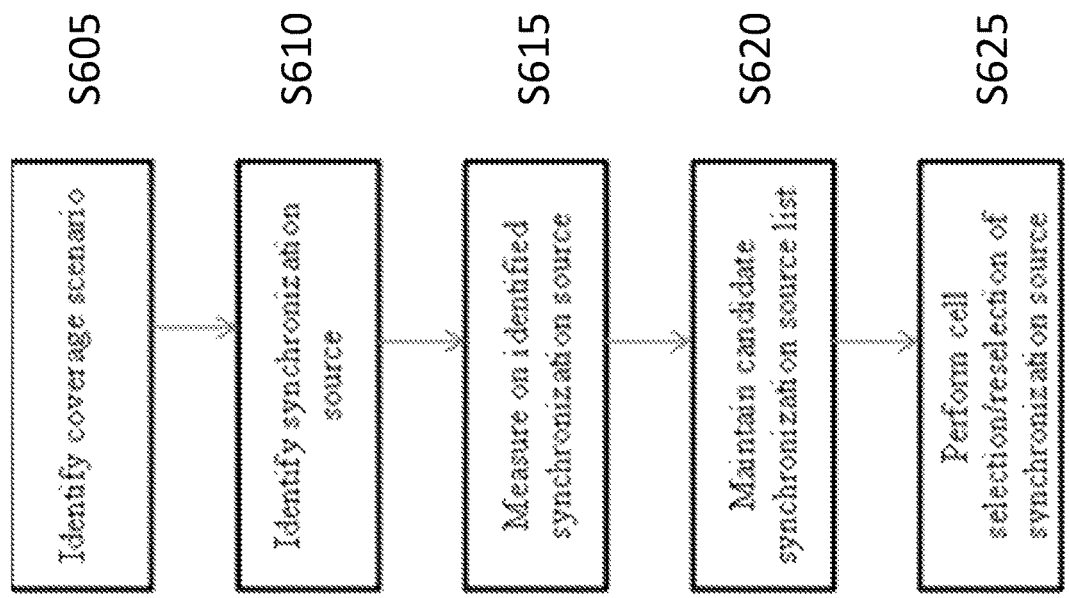
FIG. 6 is a flowchart illustrating a method performed by a D2D UE in out-of-network-coverage to measure on neighbor synchronization references according to an embodiment of the disclosed subject matter.

FIG. 6 is a flowchart illustrating a method performed by a D2D UE in out-of-network-coverage to measure on neighbor synchronization references according to an embodiment of the disclosed subject matter. This method enables the D2D UE to measure on identified synchronization references and then keep track of the measurements. The type of measurement performed depends on the synchronization reference type.

Referring to FIG. 6, the D2D UE identifies a coverage scenario (S605). For example, it may regularly detect or determine or assess its coverage scenario or state e.g. based on WAN signal measurements. In some embodiments, if one or more signal measurements done by the D2D on the serving cell are below their respective thresholds and/or the D2D UE cannot receive any cellular/WAN signals from the serving cell or from any cell then the D2D UE may determine that it is in ONC.

If the synchronization reference is a ProSe synchronization reference, then the D2D UE may have to first acquire synchronization signals (e.g. PSSS/SSSS) to achieve time and frequency synchronization. Accordingly, the method also enables the D2D UE to acquire physical identity of the ProSe synchronization reference source (e.g. Sidelink Synchronization Source ID [SLSS ID]). Thereafter, if certain signal conditions are met then the ProSe synchronization reference source is considered to be identified or detected by the D2D UE (S610). The D2D UE may store the information related to the acquired time synchronization, frequency synchronization and physical identity of the ProSe synchronization reference source. For example, the ProSe synchronization source may be considered detectable if reference signal measurement (e.g. S-RSRP) is above a threshold and also synchronization signal strength and/or quality (e.g. ProSe SCH_RP, ProSe SCH Ês/Iot [aka SCH SINR]) are above their respective threshold.

After this the D2D UE may perform measurement on that new identified synchronization reference using reference signals transmitted by that synchronization reference e.g. D2DSS (S615). This measurement done on D2DSS is known as S-RSRP (Sidelink RSRP) measurement. The D2D UE may maintain a list with candidate synchronization sources that have been identified and/or where measurements have been performed (S620).

In certain examples, synchronization references or synchronization sources on which the D2D UE (e.g. UE A) measures in parallel are other D2D UEs, e.g. other ProSe UEs such as ProSe UEs capable of direct communication and/or direct discovery.

In some embodiments, if detected synchronization reference is a cell on the ProSe carrier or another pre-configured carrier that is supported by the UE, then the UE may perform RSRP measurement on them contained in CRS symbols.

In some other embodiments, if detected synchronization reference belongs to third type of synchronization source, then the UE may perform measurements on that new synchronization reference. In general, the disclosed subject matter does not limit the measurement to a certain type, and the described concepts are applicable to any type of measurements that are supported by the UE. Examples of such additional or other measurements include path loss, SNR, SINR, RSRQ, and S-RSRQ (sidelink RSRQ).

The ProSe UE may then use these measurements to compare and evaluate whether it is necessary to perform selection or reselection of synchronization reference (S625).

In one example, the ProSe UE may be configured to measure on more than one identified synchronization references within a certain time period (T0) while being in out-of-network-coverage. In another example, the ProSe UE may be configured to measure on at least X number of identified synchronization references within a certain time period (T0) while being in out-of-network-coverage. The X number of identified synchronization references may be those with strongest signal level e.g. whose respective S-RSRP are the strongest or highest. This operation or procedure is also herein termed as performing parallel or simultaneous measurements on two or more synchronization references over the same time period. The time period (T0) may also be called as measurement period, L1 measurement time, etc. As an example, X and T0 may be 8 identified synchronization references and 400 ms respectively.

The UE may then perform measurement and also update the list of neighbor (candidate) synchronization references as the synchronization references in its vicinity changes over time.

In another example, the ProSe UE in ONC may use the information about the neighbor (candidate) synchronization references for creating a map of neighbors, for e.g. ANR functionalitity. In addition, the UE may use this type of map for other purposes, such as D2D specific services that rely on neighbor mapping.

In yet another example, in out-of-network-coverage scenario, the candidate synchronization sources may vary different compared to those used in network coverage scenario or in partial network coverage scenario. With the in-network coverage scenario, the cells and base stations (e.g. eNBs) are always in a fixed position and the measurement performance of the performed measurements may depend on radio characteristics such as radio channel or propagation channel (e.g. multipath profile, Delay spread etc) and on UE mobility profile e.g. UE speed, Doppler frequency, or direction of motion. However, in out of coverage scenario, the synchronization may not be in a fixed position. In a certain area there may be many synchronization sources while in other areas there may be only few and maybe no synchronization sources at all. In these examples, it is important that the D2D UE keeps track on candidate/neighbor synchronization references and their signal level, e.g. timing, carrier frequency, signal quality, or signal strength. The signal quality can be determined, for example, by comparing the measured signal (e.g. S-RSRP) to pre-defined measurement accuracy requirements (e.g. within ±3 dB) of S-RSRP. This may improve the selection and reselection procedure of synchronization significantly compared to the case if the UE does not keep track of neighbor synchronization sources and their quality.

The procedure of UE detecting and performing measurement on the synchronization references may comprise UE first acquiring PSSS/SSSS of another ProSe synchronization reference. This may take certain time depending on the carrier on which the UE performs search on. The UE then performs S-RSRP measurement on the identified ProSe synchronization reference. Thereafter, the UE may add the measured cell on a list or it may replace an already existing synchronization reference with the newly identified synchronization reference if, e.g. the received signal quality is stronger and the list size is fixed.

The D2D UE measurement procedure described above relates to simultaneous measurements on multiple synchronization sources in ONC would require the D2D UE to implement additional or extra hardware circuitry e.g. processing unit or memory. The additional or extra hardware circuitry would allow the D2D UE to maintain timing etc. for several synchronization sources even if the D2D UE and synchronization sources are moving and the relative radio characteristics are changing over time.

In another embodiment, a D2D UE performs a method in in-network coverage or in partial-network coverage. This method enables the D2D UE to measure on identified synchronization references and keep track of their measurements. The type of measurement performed depends on the synchronization reference type.

The D2D UE may regularly detect or determine or assess its coverage scenario or state e.g. based on WAN signal measurements. For example if one or more signal measurements performed by the D2D on the serving cell are below their respective thresholds and/or the D2D UE cannot receive any cellular/WAN signals from the serving cell or from any cell then the D2D UE may determine that it is in ONC.

The synchronization reference is typically a cell in in-network coverage scenarios, so the D2D UE may have to first acquire synchronization signals (e.g. PSS/SSS) to achieve time and frequency synchronization. PSS/SSS are transmitted in downlink subframe #0 and #5 in every radio frame. This procedure also enables the D2D UE to acquire the physical identity (e.g. PCI if the synchronization reference is a cell) of the synchronization reference. After this procedure, if certain signal conditions are met then the cell is considered to be detectable or identified by the D2D UE. The D2D UE for example may store the information related to the acquired time synchronization, frequency synchronization and physical identity of the identified synchronization reference. For example, a cell may be considered detectable if reference signal measurement (e.g. RSRP) is above a threshold and also synchronization signal strength and/or quality (e.g. SCH_RP, SCH Es/Iot [aka SCH SINR]) are above their respective threshold.

In partial-network coverage the D2D UE may be indirectly synchronized to another cell via another D2D UE. If the synchronization reference is a ProSe synchronization reference, then the D2D UE may have to first acquire synchronization signals (e.g. PSSS/SSSS) to achieve time and frequency synchronization. This procedure also enables the D2D UE to acquire physical identity of the ProSe synchronization reference source (e.g. SLSS ID). After this procedure if certain signal conditions are met then the ProSe synchronization reference source is considered to be identified or detected by the D2D UE. The D2D UE for example may store the information related to the acquired time synchronization, frequency synchronization and physical identity of the ProSe synchronization reference source. For example the ProSe synchronization source may be considered detectable if reference signal measurement (e.g. S-RSRP) is above a threshold and also synchronization signal strength and/or quality (e.g. ProSe SCH_RP, ProSe SCH Es/Iot [aka ProSe SCH SINR]) are above corresponding thresholds.

Thereafter, the D2D UE may perform measurement on that new identified synchronization reference using reference signals transmitted by that synchronization reference, e.g. CRS, D2DSS. This measurement performed on D2DSS is known as S-RSRP, and measurement done on CRS is known as RSRP. The first measurement refers to a situation where the synchronization reference is a ProSe synchronization reference and the latter refers to a situation where the synchronization reference is a cell.

In the in-coverage and partial coverage scenarios, the D2D capable UE may still be synchronized to a cell. But the D2D UE may be able to detect other synchronization references, e.g. ProSe UEs transmitting ProSe synchronization signals as illustrated in FIG. 5. There are several potential benefits to UE measuring on numerous identified synchronization references of both cellular type and ProSe type.

In a first example, the detected synchronization reference is a cell. In this case, the UE may perform RSRP measurement on that new cell and then add that cell to the list of candidate synchronization references. In a second example, if detected synchronization reference belongs to a ProSe synchronization reference, then the UE may perform S-RSRP measurements on that new synchronization reference. In a third example, the D2D UE may perform measurements on identified synchronization references of both cellular type and ProSe type, as illustrated in FIG. 5.

In all these examples, the ProSe UE may be configured to measure on more than one identified synchronization references within a certain time period (T0) while being under network coverage. In addition, the ProSe UE may also be configured to measure on at least X number of identified synchronization references within a certain time period (T0) while being under network coverage. The X number of identified synchronization references may be those with strongest signal level e.g. whose respective RSRP/S-RSRP are the strongest or highest. This operation or procedure is also herein termed as performing parallel or simultaneous measurements on two or more synchronization references over the same time period. The time period (T0) may also be called as measurement period or L1 measurement time. As an example X and T0 may be 8 identified synchronization references and 400 ms respectively.

The ProSe UE may then perform measurement and also update the list of neighbor (candidate) synchronization references as the synchronization references that become detectable changes over time. The ProSe UE may then use these measurements to compare and evaluate whether it is necessary to perform selection or reselection of synchronization references.

The disclosed subject matter does not limit the measurements to a certain type only. Rather, the described concepts are applicable to any type of measurements that are supported by the UE. Examples of such additional or other measurements are path loss, SNR, SINR, and RSRQ.

In another example, the ProSe UE in in-coverage scenario may use the information about the neighbor (candidate) synchronization references for creating a map of neighbors. This type of information may be used for handover, and Automatic Neighbor Relations (ANR) functionalities. In addition, the UE may use this type of map for other purposes, such as D2D specific services that rely on neighbor mapping.

In yet another example, the ProSe UE may use the information provided in the list of measured synchronization references to prepare the UE for performing selection and re-selection of synchronization references. Hence, the possible selection and re-selection can be performed in-time and in a more reliable manner.

In these examples, it is important that the D2D UE keeps track on candidate/neighbor synchronization references and their signal level, e.g. timing, carrier frequency, signal quality, or signal strength. The signal quality can be determined for example by comparing the measured signal (e.g. RSRP, S-RSRP) to pre-defined measurement accuracy requirements (e.g. within ±3 dB) of S-RSRP. This may improve the selection and reselection procedure of synchronization significantly compared to a situation where the UE does not keep track of neighbor synchronization sources and their quality.

The process of UE detecting and performing measurement on the synchronization references may comprise UE first acquiring PSS/SSS if the synchronization reference is of cellular type, PSSS/SSSS if synchronization reference is of ProSe type. This may take a certain amount of time depending on the carrier on which the UE performs search. The UE then must perform RSRP/S-RSRP measurement on the identified synchronization reference. Thereafter, the UE may add the measured cell on a list or it may replace an already existing synchronization reference with the newly identified synchronization reference if e.g. the received signal quality is stronger and the list size is fixed.

The D2D UE measurement procedure described above, with simultaneous measurements on multiple synchronization sources in in-network coverage (INC) and partial network coverage (PNC), could require a D2D UE to further implement additional hardware circuitry e.g. processing unit, memory etc. The D2D UE in INC and PNC may also need to measure on neighbor cells i.e. on WAN signals. Therefore additional hardware circuitry would allow the D2D UE to maintain timing etc. for several synchronization sources while also measure on cells when the D2D UE is in INC or PNC.

Figure 7:
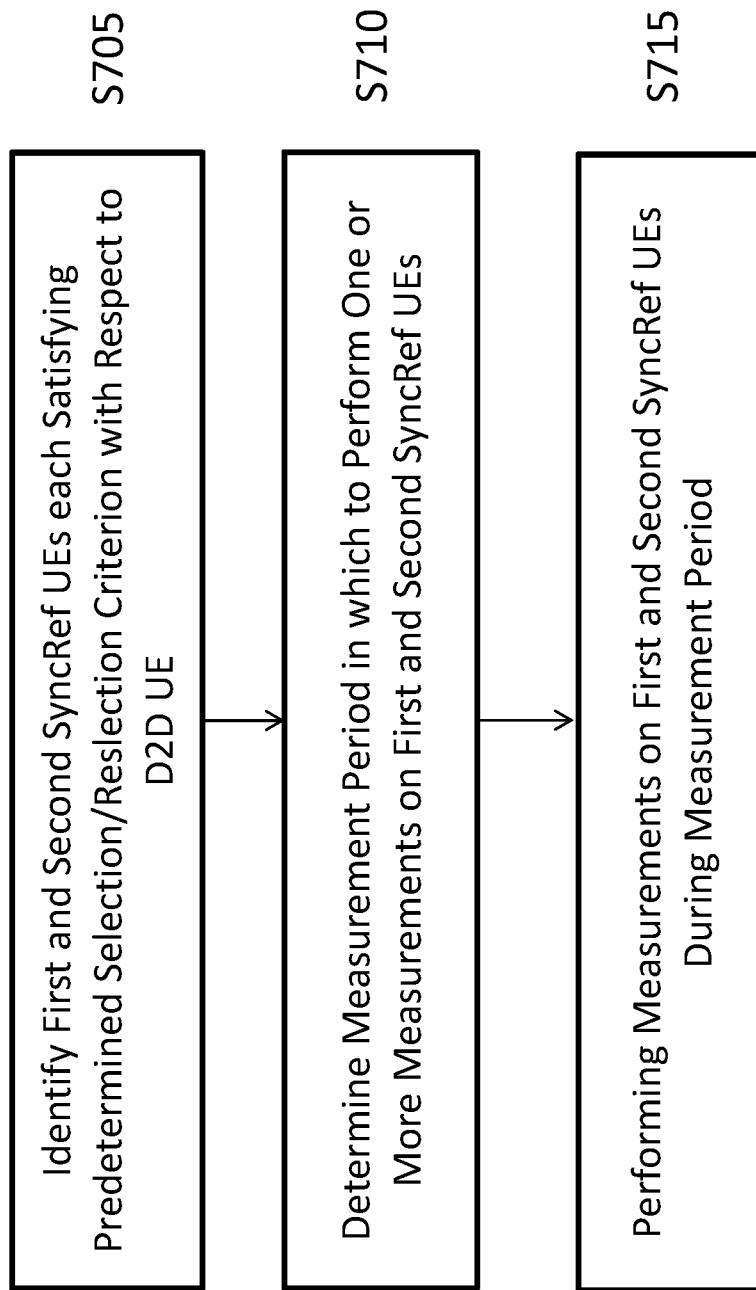
FIG. 7 is a flowchart illustrating a method performed by a D2D UE in a wireless communication system according to an embodiment of the disclosed subject matter.

FIG. 7 is a flowchart illustrating a method performed by a D2D UE in a wireless communication system according to an embodiment of the disclosed subject matter.

Referring to FIG. 7, the method comprises identifying at least first and second SyncRef UEs each satisfying a predetermined selection/reselection criterion with respect to the D2D UE (S705), determining a measurement period in which to perform one or more measurements on the identified at least first and second SyncRef UEs (S710), and performing the one or more measurements on each of the identified at least first and second SyncRef UEs during the determined measurement period (S715).

In some embodiments, the method further comprises selecting a synchronization reference for the D2D UE from among a set of candidate synchronization references including the identified at least first and second SyncRef UEs based on at least the one or more measurements. The method may still further comprise detecting that the D2D UE has lost synchronization with a current synchronization reference, and performing the one or more measurements on each of the identified at least first and second SyncRef UEs in response to detecting that the D2D UE has lost synchronization with the current synchronization reference. The current synchronization reference may be a network node, for example.

In some embodiments, the one or more measurements comprise sidelink reference signal received power (S-RSRP) measurements.

In some embodiments, the method further comprises detecting a coverage scenario for the D2D UE, and performing the one or more measurements on each of the identified at least first and second SyncRef UEs in response to determining that the coverage scenario is an out-of-network coverage (ONC) scenario. In such embodiments, detecting the coverage scenario may comprise identifying the coverage scenario as the ONC scenario in response to determining that one or more wide area network (WAN) measurements performed by the D2D UE are below corresponding threshold values.

In some embodiments, the measurement period is approximately 400 ms.

In some embodiments, the selection/reselection criterion is satisfied by each of the first and second SyncRef UEs according to a corresponding sidelink reference signal received power (S-RSRP) measurement performed by the D2D UE.

In some embodiments, the at least first and second SyncRef UEs comprise six SyncRef UEs.

In some embodiments, the method further comprises identifying a cell satisfying one or more predetermined cell identification criteria, determining a measurement period in which to perform one or more measurements on the identified cell, and performing the one or more measurements on the identified cell during the determined measurement period. The method may further comprise performing the one or more measurements on the plurality of the identified cells during the determined measurement period. The method may still further comprise detecting a coverage scenario for the D2D UE, and performing the one or more measurements on each of the identified at least cells in response to determining that the coverage scenario is any of an in-network coverage (INC) scenario or partial network coverage (PNC).

In some related embodiments, the at least first and second synchronization reference (SyncRef) UEs are identified in series time. In this context, the term "series time" means that one synchronization reference is identified first, followed by the other one at some time thereafter. For instance, the first synchronization reference could be detected within a first detection period $T_{detect,SyncRef}$ and then the second synchronization reference could be detected within a second detection period $T_{detect,SyncRef}$ subsequent to the first detection period. In some related embodiments, the one or more measurements are performed on the identified at least first and second SyncRef UEs in parallel. In other words, the measurements may be performed, at least in part, at the same time, e.g., within a common 400 ms period.

Figure 8:
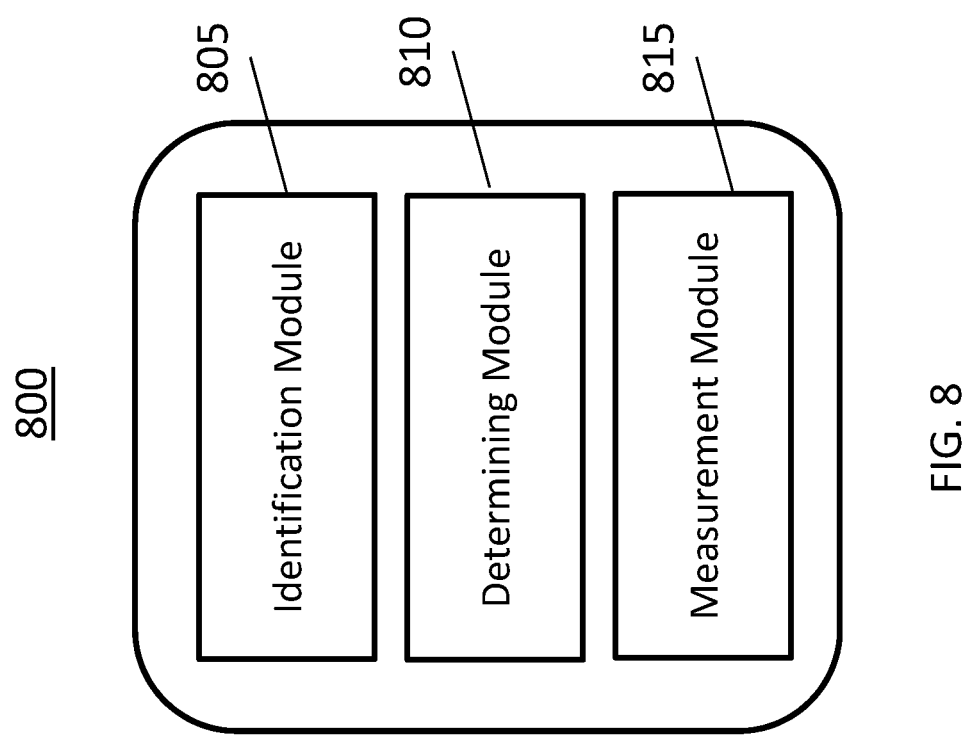
FIG. 8 is a diagram illustrating a D2D UE apparatus according to an embodiment of the disclosed subject matter.

FIG. 8 is a diagram illustrating a D2D UE apparatus 800 according to an embodiment of the disclosed subject matter. Apparatus 800 may be configured to perform a method such as that of FIG. 6 or 7. Apparatus 800 is illustrated as a collection of modules configured to perform corresponding functions. In general, such modules could be formed by any suitable combination of hardware and/or software capable of performing those functions. For instance, such modules could be formed by any suitable combination of electronic circuits, processors, controllers, memories, and/or accompanying software.

Referring to FIG. 8 apparatus 800 comprises an identification module 805 configured to identify at least first and second SyncRef UEs each satisfying a predetermined selection/reselection criterion with respect to the D2D UE, a determining module 810 configured to determine a measurement period in which to perform one or more measurements on the identified at least first and second SyncRef UEs, and a measurement module 815 configured to perform the one or more measurements on each of the identified at least first and second SyncRef UEs during the determined measurement period.

In some embodiments, apparatus 800 further comprises one or more additional modules configured to select a synchronization reference for the D2D UE from among a set of candidate synchronization references including the identified at least first and second SyncRef UEs based on at least the one or more measurements. Apparatus 800 may still further comprise additional modules configured to detect that the D2D UE has lost synchronization with a current synchronization reference, and to perform the one or more measurements on each of the identified at least first and second SyncRef UEs in response to detecting that the D2D UE has lost synchronization with the current synchronization reference. The current synchronization reference may be a network node, for example.

In some embodiments, the one or more measurements comprise sidelink reference signal received power (S-RSRP) measurements.

In some embodiments, apparatus 800 further comprises one or more additional modules configured to detect a coverage scenario for the D2D UE, and performing the one or more measurements on each of the identified at least first and second SyncRef UEs in response to determining that the coverage scenario is an out-of-network coverage (ONC) scenario. In such embodiments, detecting the coverage scenario may comprise identifying the coverage scenario as the ONC scenario in response to determining that one or more wide area network (WAN) measurements performed by the D2D UE are below corresponding threshold values.

In some embodiments, the measurement period is approximately 400 ms.

In some embodiments, the selection/reselection criterion is satisfied by each of the first and second SyncRef UEs according to a corresponding sidelink reference signal received power (S-RSRP) measurement performed by the D2D UE.

In some embodiments, the at least first and second SyncRef UEs comprise six SyncRef UEs.

In some embodiments, apparatus 800 further comprises one or more additional modules configured to identify a cell satisfying one or more predetermined cell identification criteria, determining a measurement period in which to perform one or more measurements on the identified cell, and performing the one or more measurements on the identified cell during the determined measurement period. Apparatus 800 may still further comprise one or more additional modules configured to perform the one or more measurements on the plurality of the identified cells during the determined measurement period. Apparatus 800 may still further comprise one or more additional modules configured to detect a coverage scenario for the D2D UE, and performing the one or more measurements on each of the identified at least cells in response to determining that the coverage scenario is any of an in-network coverage (INC) scenario or partial network coverage (PNC).

In some related embodiments, the at least first and second synchronization reference (SyncRef) UEs are identified in series time. In some related embodiments, the one or more measurements are performed on the identified at least first and second SyncRef UEs in parallel. In other words, the measurements may be performed, at least in part, at the same time, e.g., within a common 400 ms period.

Certain aspects of the disclosed subject matter may relate to standardized technology. For instance, the following are changes from a change request (CR) proposed for 3GPP specification 36.133 through Ericsson's contribution (R4-150752).

11.4 Measurements for UE Capable of ProSe Direct Communication in any Cell Selection State 11.4.1 Introduction This clause contains requirements on the UE regarding detection of ProSe synchronization sources transmitting D2DSS signals in any cell selection state. These measurements may be used by the UE capable of ProSe direct communication in any cell selection state for selection of synchronization source and re-selection of synchronization source.

The measurement quantities are defined in [4], the measurement model is defined in [22] and measurement accuracies are specified in section 11.5.

11.4.2 Requirements 11.4.2.1 Identification of ProSe Synchronization Sources Requirements The UE shall be able to identify new ProSe synchronization sources and perform S-RSRP measurements of the identified ProSe synchronization sources. During the any cell selection state the UE shall continuously measure the identified synchronization sources and additionally search for and identify new synchronization sources.

The UE capable of ProSe direct communication shall be able to identify a new detectable ProSe synchronization source within Tbasic_identify_OoC_ProSe_SS.

whereKishoen30

Tbasic_identify_OoC_ProSeSS is [1000] ms

A ProSe synchronization source shall be considered detectable when

S-RSRP related side conditions given in Sections 11.4.2.1 and 11.4.2.2 are fulfilled for a corresponding Band, D2D SCH_RP and D2D SCH Es/Iot according to Annex B. 5.1 for a corresponding Band.

Identification of a ProSe synchronization source shall include detection of the ProSe synchronization source cell and additionally performing a single measurement with measurement period of TMeasurement_Period_OoC_ProSe_SS. If higher layer filtering is used, an additional ProSe synchronization source identification delay can be expected.

In the any cell selection state the measurement period for intra frequency measurements is [400] ms. The UE capable of ProSe direct communication shall be capable of performing S-RSRP measurements for [8] identified ProSe synchronization sources with the measurement period of [400] ms.

The S-RSRP measurement accuracy for all measured synchronization sources shall be as specified in the subclauses 11.5.2.1 and 11.5.2.2.

As indicated by the foregoing, a ProSe UE may detect its coverage scenario based on one or more signal measurements. The ProSe UE may then perform a measurement on identified synchronization references. The synchronization reference may be of cellular type (e.g. cell/eNB) or ProSe type (e.g. SyncRefUE). The ProSe UE may measure on at least K (K>1) identified synchronization references and storing the measurements.

There are several potential benefits of a ProSe UE measuring multiple identified synchronization references, as described above. One such benefit is that the selection and re-selection of synchronization reference procedure may be performed more reliably. The selection and re-selection may also be performed faster since the UE may be aware of which are the candidate synchronization sources. This is especially important in ONC scenario where the network and available synchronization references may change over time. This type of measurement information can also be used for other services, such as ANR, mobility, D2D specific services.

The following abbreviations are used in this disclosure.

ACK Acknowledged
ADC Analog-to-digital conversion
AGC Automatic gain control
ANR Automatic neighbor relations
AP Access point
BCH Broadcast channel
BLER Block error rate
BS Base station
BSC Base station controller
BTS Base transceiver station
CA Carrier aggregation
CC Component carrier
CG Cell group
CGI Cell global identity
CP Cyclic prefix
CPICH Common pilot channel
CSG Closed subscriber group
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
INC In-Network Coverage
M2M machine to machine
MAC Media access control
MCG Master cell group
MDT Minimization of drive tests
MeNB Master eNode B
MME Mobility management entity
MRTD Maximum receive timing difference
MSR Multi-standard radio
NACK Not acknowledged
OFDM Orthogonal frequency division multiplexing
ONC Out-of-Network Coverage
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PNC Partial Network Coverage
PSCell Primary SCell
PSC Primary serving cell PSS Primary synchronization signal
RAT Radio Access Technology
RF Radio frequency
RLM Radio link monitoring
RNC Radio Network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
SCC Secondary component carrier
SCell Secondary Cell
SCG Secondary Cell Group
SeNB Secondary eNode B
SFN System frame number
SGW Signaling gateway
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
UL Uplink While the disclosed subject matter has been presented above with reference to various embodiments, it will be understood that various changes in form and details may be made to the described embodiments without departing from the overall scope of the described concepts.

What is claimed:

1. A method performed by a device-to-device (D2D) user equipment (UE) in a wireless communication system, comprising:
   identifying at least first and second synchronization reference (SyncRef) UEs each satisfying a predetermined selection/reselection criterion with respect to the D2D UE;
   determining a measurement period in which to perform one or more measurements on the identified at least first and second SyncRef UEs;
   performing the one or more measurements on each of the identified at least first and second SyncRef UEs during the determined measurement period;
   identifying a plurality of cells satisfying one or more predetermined cell identification criteria;
   determining a cell measurement period in which to perform one or more measurements on the identified cells; and
   performing the one or more measurements on the plurality of identified cells during the determined cell measurement period.

2. The method of claim 1, further comprising selecting a synchronization reference for the D2D UE from among a set of candidate synchronization references including the identified at least first and second SyncRef UEs based on at least the one or more measurements.

3. The method of claim 2, further comprising:
   detecting that the D2D UE has lost synchronization with a current synchronization reference; and
   performing the one or more measurements on each of the identified at least first and second SyncRef UEs in response to detecting that the D2D UE has lost synchronization with the current synchronization reference.

4. The method of claim 3, wherein the current synchronization reference is a network node.

5. The method of claim 1, wherein the one or more measurements comprise sidelink reference signal received power (S-RSRP) measurements.

6. The method of claim 1, further comprising detecting a coverage scenario for the D2D UE, and performing the one or more measurements on each of the identified at least first and second SyncRef UEs in response to determining that the coverage scenario is an out-of-network coverage (ONC) scenario.

7. The method of claim 6, wherein detecting the coverage scenario comprises identifying the coverage scenario as the ONC scenario in response to determining that one or more wide area network (WAN) measurements performed by the D2D UE are below corresponding threshold values.

8. The method of claim 1, wherein the measurement period is approximately 400 ms.

9. The method of claim 1, wherein the selection/reselection criterion is satisfied by each of the first and second SyncRef UEs according to a corresponding sidelink reference signal received power (S-RSRP) measurement performed by the D2D UE.

10. The method of claim 1, wherein the at least first and second SyncRef UEs comprise six SyncRef UEs.

11. The method of claim 1, further comprising:
    detecting a coverage scenario for the D2D UE; and
    performing the one or more measurements on each of the identified cells in response to determining that the coverage scenario is any of an in-network coverage (INC) scenario or partial network coverage (PNC).

12. The method of claim 1, wherein the at least first and second synchronization reference (SyncRef) UEs are identified in series time.

13. The method of claim 1, wherein the one or more measurements are performed on the identified at least first and second SyncRef UEs in parallel.

14. A device-to-device (D2D) user equipment (UE) apparatus, comprising:
    at least one processor operatively coupled to a memory and configured to:
    identify at least first and second synchronization reference (SyncRef) UEs each satisfying a predetermined selection/reselection criterion with respect to the D2D UE;
    determine a measurement period in which to perform one or more measurements on the identified at least first and second SyncRef UEs;
    perform the one or more measurements on each of the identified at least first and second SyncRef UEs during the determined measurement period;
    identifying a plurality of cells satisfying one or more predetermined cell identification criteria;
    determining a cell measurement period in which to perform one or more measurements on the identified cells; and
    performing the one or more measurements on the plurality of identified cells during the determined cell measurement period.

15. The apparatus of claim 14, wherein the at least one processor is further configured to select a synchronization reference for the D2D UE from among a set of candidate synchronization references including the identified at least first and second SyncRef UEs based on at least the one or more measurements.

16. The apparatus of claim 15, wherein the at least one processor is further configured to:
   detect that the D2D UE has lost synchronization with a current synchronization reference; and
   perform the one or more measurements on each of the identified at least first and second SyncRef UEs in response to detecting that the D2D UE has lost synchronization with the current synchronization reference.

17. The apparatus of claim 16, wherein the current synchronization reference is a network node.

18. The apparatus of claim 14, wherein the one or more measurements comprise sidelink reference signal received power (S-RSRP) measurements.

19. The apparatus of claim 14, wherein the at least one processor is further configured to detect a coverage scenario for the D2D UE, and perform the one or more measurements on each of the identified at least first and second SyncRef UEs in response to determining that the coverage scenario is an out-of-network coverage (ONC) scenario.

20. The apparatus of claim 19, wherein the detection of the coverage scenario comprises identifying the coverage scenario as the ONC scenario in response to determining that one or more wide area network (WAN) measurements performed by the D2D UE are below corresponding threshold values.

21. The apparatus of claim 14, wherein the measurement period is approximately 400 ms.

22. The apparatus of claim 14, wherein the selection/reselection criterion is satisfied by each of the first and second SyncRef UEs according to a corresponding sidelink reference signal received power (S-RSRP) measurement performed by the D2D UE.

23. The apparatus of claim 14, wherein the at least first and second SyncRef UEs comprise six SyncRef UEs.

24. A non-transitory, tangible computer-readable medium having instructions stored thereon that, when executed by a processor, cause the processor to perform operations comprising:
   identifying at least first and second synchronization reference (SyncRef) UEs each satisfying a predetermined selection/reselection criterion with respect to the D2D UE;
   determining a measurement period in which to perform one or more measurements on the identified at least first and second SyncRef UEs;
   detecting a coverage scenario for the D2D UE;
   in response to determining that the coverage scenario is an out-of-network coverage (ONC) scenario, performing the one or more measurements on each of the identified at least first and second SyncRef UEs during the determined measurement period;
   identifying a plurality of cells satisfying one or more predetermined cell identification criteria;
   determining a cell measurement period in which to perform one or more measurements on the identified cells; and
   performing the one or more measurements on the plurality of identified cells during the determined cell measurement period.

25. The computer-readable medium of claim 24, wherein the operations comprise performing the one or more measurements on a plurality of the identified cells during the determined cell measurement period.

26. The computer-readable medium of claim 25, wherein the operations comprise:
   detecting a coverage scenario for the D2D UE; and
   performing the one or more measurements on each of the identified cells in response to determining that the coverage scenario is any of an in-network coverage (INC) scenario or partial network coverage (PNC).

27. The apparatus of claim 14, wherein the at least first and second synchronization reference (SyncRef) UEs are identified in series time.

28. The apparatus of claim 14, wherein the one or more measurements are performed on the identified at least first and second SyncRef UEs in parallel.

* * * * *